Nov. 12, 1968   E. WIELAND ET AL   3,410,150
BLOCKING MECHANISM FOR SHIFTING DEVICES
Filed Dec. 16, 1965   2 Sheets-Sheet 1

INVENTORS.
EGON WIELAND
FRITZ ROTERS

*Dicke + Craig*
BY   ATTORNEYS

Nov. 12, 1968   E. WIELAND ET AL   3,410,150
BLOCKING MECHANISM FOR SHIFTING DEVICES
Filed Dec. 16, 1965   2 Sheets-Sheet 2
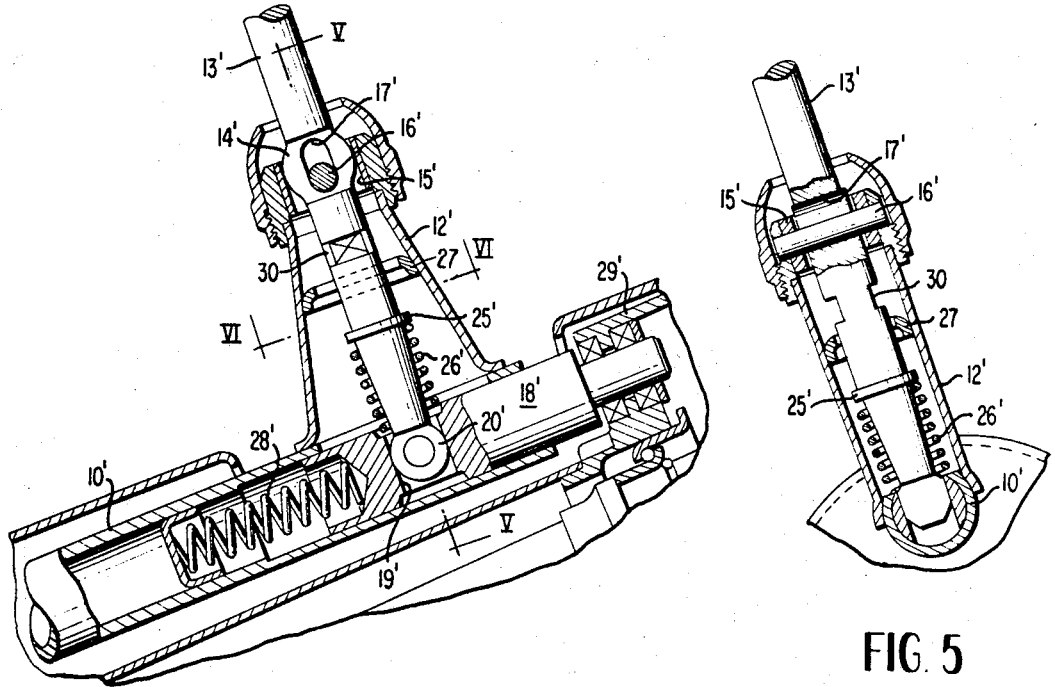
FIG. 4
FIG. 5
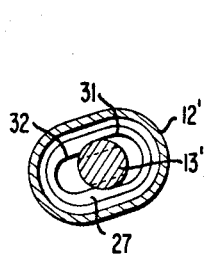
FIG. 6
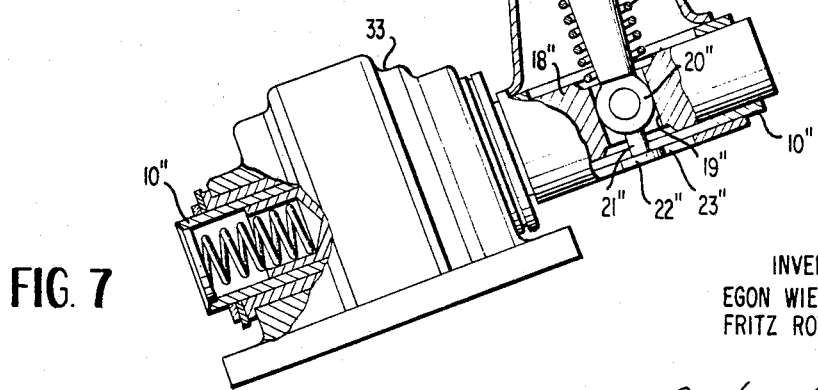
FIG. 7
INVENTORS
EGON WIELAND
FRITZ ROTERS
BY *Craig e Antonelli*
ATTORNEYS United States Patent Office 3,410,150
Patented Nov. 12, 1968

3,410,150
BLOCKING MECHANISM FOR
SHIFTING DEVICES
Egon Wieland, Stuttgart-Feuerbach, and Fritz Roters, Russelsheim, Germany, assignors to Daimler-Benz Aktiengesellschaft, Stuttgart-Unterturkheim, Germany
Filed Dec. 16, 1965, Ser. No. 514,255
Claims priority, application Germany, Dec. 17, 1964, D 46,079
23 Claims. (Cl. 74—476)

ABSTRACT OF THE DISCLOSURE

A selectively operable shifting blocking means for the reverse speed in shifting mechanisms of motor vehicle change-speed transmission, in which the manual shifting lever is pivotally connected at the shifting rod so as to be displaceable in the direction of its longitudinal axis, and in which this shifting lever is adapted to be pivoted with respect to the shifting rod into the shifting planes of the forward speeds and into a shifting plane for the reverse speed and is additionally provided with a blocking member, which in conjunction with abutments at the shifting rod coordinated to the shifting planes limits the pivot movements of the shifting lever.

Background of the invention

With a known shifting blocking mechanism of this type in a steering column shifting mechanism, which carries the shifting lever on a rotatably but axially non-displaceably supported shifting tube and in which a Bowden cable, disposed inside of the shifting tube and transmitting the preselection to the transmission, engages with the shifting lever, the shifting lever which is axially displaceable in a known manner against a spring force, slides with an extension, bolt or the like on an offset cam piece that is arranged on the side of the shifting tube opposite the pivotal connection of the shifting lever and extends concentrically to the point of pivotal connection.

This known shift blocking device cannot be utilized for shifting mechanisms in which the shifting rod is axially displaceable for the transmission of the preselection movement of the shifting lever. Additionally, this prior art shift blocking device does not offer a safe assurance against the unintentional engagement of the reverse speed since the bolt of the shifting lever may jump relatively easily during a shifting back over the stepped cam piece so that the shifting lever is pivoted into the shifting plane of the reverse speed instead of into the shifting plane of the lower speed.

Summary of the invention

The purpose underlying the present invention essentially consists in eliminating the aforementioned disadvantages and to improve in this sense the shifting blocking mechanism of the type described above.

The present invention is essentially characterized in that the shifting rod is provided within the pivot area of the shifting lever, symmetrically to the pivot plane thereof or in a plane parallel thereto, with two adjoining apertures, namely with a first aperture disposed at right angle to the rod axis and of cross section having a constant width which serves as abutment for the shifting planes of the forward speeds, and with a second aperture disposed also at right angle to the rod axis and of constant narrower cross section which serves as abutment for the shifting plane of the reverse speed; additionally the present invention is characterized in that the shifting lever is provided with a blocking pin of narrower cross section coaxial to the two apertures which terminates at its free end in a collar-like blocking extension of wider cross section, whereby the collar-like blocking extension is form-lockingly guided in the aperture of the shifting rod of wider cross section and is brought out of engagement from the same by an axial displacement of the shifting lever whereas the locking pin of narrower cross section is adapted to be form-lockingly inserted into the aperture of narrower cross section of the shifting rod exclusively after this axial displacement.

It is known in the prior art to pivotally connect the manual shifting lever concentrically at a bearing housing which is securely connected with the shifting rod. In order to permit the application of the present invention both with steering column shifting mechanisms as well as also with center shifting mechanisms and independently of whether the shifting rod is axially displaceable or is axially secured, according to a further feature of the present invention, the shifting rod may be constructed of tubular shape at least within the area of the bearing housing and may be provided with a coaxial guide pin, which is adapted to move axially and rotatably relative to the shifting rod and includes a guide means for the shifting lever normal to the axis of the shifting rod, whereby the manual shifting lever engages with a ball joint thereof flattened off parallel to its pivot plane in the aperture of the guide pin disposed normal to the axis thereof and essentially of rectangular shape in cross section pivotally within a plane through the axis thereof and slidingly non-rotatably in relation to this axis.

With shifting installations having an axially fixed shifting rod, the guide pin may be advantageously connected rigidly with the shifting member transmitting the preselection movement for the selection of the shifting lanes whereas with an axially displaceable shifting rod, the guide pin may be secured rotatably but axially non-displaceably at a fixed vehicle part as bearing pin for the shifting rod.

According to a further advantageous feature and development of the present invention, the bearing housing may be provided with a fixed abutment part arranged essentially perpendicular to the pivot plane of the manual shifting lever and parallel to the axis of the shifting rod, whereby the apertures for the shifting planes are accommodated in this fixed abutment part.

In one embodiment of the present invention, the blocking pin is secured in advantageous manner with its collar-like extension coaxially to the manual shifting lever on the side of the flattened off ball joint opposite the point of pivotal connection of the manual shifting lever in the bearing housing. In that case, one wider elongated aperture and one narrower elongated aperture each, normal to the axis, are provided also in the tubularly shaped shifting rod on the side thereof opposite the point of pivotal connection of the shifting lever in the bearing housing.

In order to keep the collar-like blocking extension in engagement with the coordinated wider elongated aperture for the shifting planes of the forward speed except during engagement of the reverse speed, the manual shifting lever is provided according to the present invention between its pivotal connecting point at the bearing housing and its flattened-off ball joint with a collar, whereby a compression coil spring arranged concentrically to the manual shifting lever is supported on the one hand, against the collar and on the other, against the shifting rod or another part immovable in the direction of the longitudinal axis of the manual shifting lever.

Accordingly, it is an object of the present invention to provide a blocking mechanism for shifting installations of the type described above which eliminates by extremely simple and operationally reliable means the aforementioned shortcomings and drawbacks encountered with the prior art constructions.

Another object of the present invention resides in a blocking mechanism for shifting installations which blocks the unintentional engagement of the reverse speed in a reliable manner.

A further object of the present invention resides in a blocking mechanism for manually shiftable change-speed gears of motor vehicles which not only is reliable in operation to assure inadvertent engagement of the reverse speed but also can be used with shifting mechanism of different constructions.

*Brief description of the drawing*

These and further objects, features, and advantages of the present invention will become more obvious from the following description when taken in connection with the accompanying drawing which shows, for purposes of illustration only, one embodiment in accordance with the present invention, and wherein:

FIGURE 4 is a partial axial cross-sectional view through a blocking mechanism in accordance with another embodiment of the present invention, similar to FIGURE 1, FIGURE 5 is a partial cross-sectional view taken along V—V of FIGURE 4, FIGURE 6 is a cross-sectional view taken along line VI—VI of FIGURE 4, and FIGURE 7 is a partial axial cross-sectional view through a third embodiment of the present invention, similar to FIGURE 1.

*Detailed description of the drawing*

Figure 1:
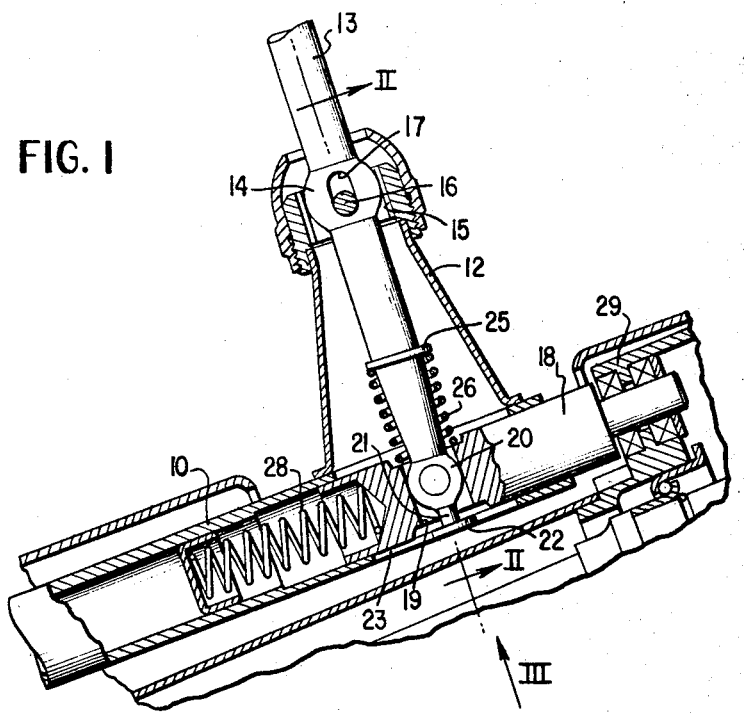
FIGURE 1 is a partial axial cross-sectional view through a blocking mechanism in accordance with the present invention for a steering column shifting mechanism of a change-speed transmission.

Referring now to the drawing wherein like reference numerals are used throughout the various views to designate like parts, reference numeral 10 designates the tubularly shaped shifting rod with which is rigidly connected in any conventional manner a bearing housing 12. The manual shifting lever 13 is pivotally connected in the bearing housing 12 in such a manner as to be displaceable in the direction of its longitudinal axis. For this purpose, the shifting lever 13 is provided with a nut-shaped joint 14 which engages in an axial guide means 15 of the bearing housing 12. A bearing bolt 16 extends through the axial guide means 15 which engages in an elongated aperture 17 of the manual shifting lever 13. The tubularly shaped shifting rod 10 is provided with a guide pin 18 which is axially and rotatably movable relative to the shifting rod 10 and which includes a guide means 19 in the form of an aperture extending normal to the rod axis and of rectangular shape in cross section. The manual shifting lever 13 slidingly engages with its ball joint 20 in the rectangular guide means 19. The ball joint 20 is flattened off parallel to the pivot plane of the manual shifting lever 13, i.e., in the plane of the drawing in FIGURE 1 and as indicated by line a—a in FIGURE 2, so that the manual shifting lever 13 slides pivotally in one plane extending through the axis of the guide pin 18 and in relation to this axis slides non-rotatably in the guide means 19. A coaxial blocking pin 21 of narrower cross section is secured at the ball joint 20 which terminates at its free end a collar-like blocking extension 22 of wider cross section.

Figure 2:
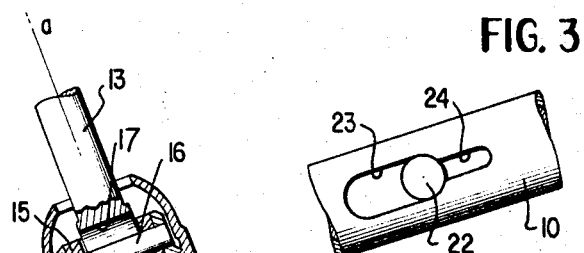
FIGURE 2 is a partial cross-sectional view taken along line II—II of FIGURE 1.
Figure 3:
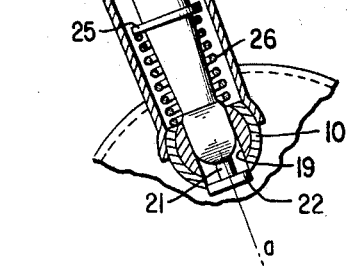
FIGURE 3 is a partial elevational view taken in the direction of arrow III of FIGURE 1.

In the illustrated position, the manual shifting lever 13 is in the shifting plane of the third and fourth gear or speed which is perpendicular to the plane of the drawing of FIGURE 1, that is the plane of FIGURE 2, and can be pivoted in the clockwise direction about bolt 16 into the shifting plane of the first and second gear or speed, that is in a plane parallel to the plane of FIGURE 2 but spaced therefrom the length of movement of collar-like blocking extension 22 within the aperture 23 as seen from FIGURE 3. This shifting movement is limited by the relatively wider elongated aperture 23 provided in the shifting rod 10 and extending perpendicularly to the axis of the shifting rod 10; the collar-like blocking extension 22 of the manual shifting lever 13 engages form-lockingly into the relatively wider elongated aperture 23. The pivoting of the manual shifting lever 13 about bolt 16 in the counter-clockwise direction as viewed in FIGURE 1 into the shifting plane of the reverse speed is blocked by the cooperation of the blocking extension 22 together with the elongated aperture 23. Only by axial displacement of the manual shifting lever 13 in the direction toward the shifting tube 10, the blocking extension 22 is displaced out of the area of the relatively narrower elongated aperture 24 and the blocking pin 21 of narrower cross section comes within the area of the narrower elongated aperture 24. Only thereafter, the blocking pin 21 can be form-lockingly inserted into the elongated aperture 24 of narrower cross section adjoining the elongated aperture 23 of wider cross section by pivoting the manual shifting lever 13 into the shifting plane of the reverse speed. The elongated aperture 24 of narrower cross section thereby limits the pivot movement of the manual shifting lever 13 into the shifting plane of the reverse speed.

The manual shifting lever 13 is provided within the area between its point of pivotal connection at the bearing housing 12 and its ball joint 20 with a collar 25 against which engages a compression coil spring 26 arranged concentrically to the manual shifting lever 13, which spring 26 also rests against the guide pin 18.

The elongated apertures 23 and 24 limiting the pivot movement of the shifting lever 13 may also be accommodated in a fixed abutment part at the bearing housing 12 arranged essentially perpendicularly to the pivot plane of the manual shifting lever 13 and parallel to the axis of the shifting tube 10; such fixed abutment part is indicated in FIGURE 4 by reference numeral 27. The reference numerals emploped in FIGURE 4 are primed and indicate parts that are identical with correspondingly numbered parts in FIGURE 1 so that in this respect further description of these identical parts will be dispensed with. In that case the shifting lever 13 has to be constructed within this fixed abutment area of corresponding cross section 30 in a pin-and-collar-like manner.

In the illustrated steering column shifting installation, the shifting tube 10 transmits the shifting and preselection movements for the engagement of the speeds and for the selection of the shifting lanes and is for that purpose supported axially displaceably and rotatably on the guide pin 18 against the effect of a spring 28. The guide pin 18 is elastically secured in any conventional manner at a fixed part 29 of the steering column bearing support (of conventional construction and therefore not illustrated in detail herein) so as to be rotatable but axially non-displaceable.

According to a third embodiment of the present invention, the same construction of the blocking mechanism for the reverse speed may also be utilized in connection with a shifting tube 10 which transmits exclusively the movement of the shifting lever for shifting the speeds and which is not displaceable axially, as shown in FIGURE 7 wherein primed reference numerals have been used to indicate parts substantially identical to those shown in FIGURE 1 so that further description of the corresponding parts will be dispensed with. In that case, in lieu of the guide pin 18", the shifting tube 10" is secured in a corresponding manner at a fixed part 33 of the steering column bearing support and the guide pin 18" is securely connected with the member transmitting the movements of the manual shifting lever for the selection of the shifting lanes.

Thus, it is obvious that the present invention is not limited to the details shown and described herein and we therefore do not wish to be limited to these details but intend to cover all such changes and modifications as are encompassed by the scope of the appended claims.

We claim:

1. A blocking mechanism for the reverse speed in shifting installations of motor vehicle change-speed gears, comprising shifting rod means, manual shifting lever means, means for pivotally supporting said shifting lever means at said shifting rod means in such a manner that said shifting lever means is able to move in the direction of its longitudinal axis and is able to pivot relative to said shifting rod means into the shifting planes for the forward speeds and into a shifting plane for the reverse speed, abutment means in the shifting installation limiting movement of said lever means to said shifting planes, blocking means on said shifting lever means and cooperating with said abutment means to limit the pivotal movement of said shifting lever means, said shifting installation being provided within the area of pivotal movement of said shifting lever means with first and second aperture means, said first aperture means being of relatively wider cross section and constituting in effect the abutment means for the shifting planes of the forward speeds, and said second aperture means being of narrower cross section and in communication with said first aperture means and constituting in effect the abutment means for the shifting plane of the reverse speed, and said blocking means including blocking pin means on said shifting lever means of relatively narrower cross section terminating toward the free end thereof in a blocking extension of wider cross section.

2. The combination according to claim 1, wherein said blocking extension is form-lockingly guided in said first-mentioned aperture means and is adapted to be disengaged therefrom by axial displacement of said shifting lever means, and the blocking pin means being adapted to be inserted form-lockingly into the second-mentioned aperture means only upon axial displacement of said shifting lever means.

3. The combination according to claim 2, wherein said first aperture means and said second aperture means are each of substantially constant width.

4. The combination according to claim 3, wherein said aperture means extend substantially normally to the axis of the shifting rod means.

5. The combination according to claim 4, wherein said blocking pin means extends substantially axially aligned with respect to said aperture means.

6. The combination according to claim 5, wherein said aperture means extend substantially symmetrically to the pivot plane of said shifting lever means.

7. The combination according to claim 5, wherein said aperture means has a longitudinal plane of symmetry substantially to within the shifting plane of said shifting lever means.

8. The combination according to claim 5, wherein said aperture means are provided in said shifting rod means.

9. The combination according to claim 1, wherein said aperture means are provided in said shifting rod means.

10. The combination according to claim 2 said shifting rod means integrally including bearing housing means arranged approximately concentrically to the shifting lever means and comprising said pivotal support means supporting said shifting lever means at said bearing housing means, said shifting rod means being constructed of tubular shape within the area of said bearing housing means, guide pin means for the tubularly shaped portion of said shifting rod means, said guide pin means and tubularly shaped portion being axially movable relative to one another, said guide pin means being provided with guide means for the shifting lever means in the form of an aperture, said shifting lever means being provided with a ball joint means and engaging said guide aperture in said guide pin means, said ball joint means and said guide pin means aperture being of substantially complementary cross section in such a manner that said shifting lever means pivotally engages in said aperture in a plane extending through the axis of said guide pin means and in relation to this axis engages non-rotatably slidingly.

11. The combination according to claim 10, wherein said aperture is of substantially rectangular configuration and extends substantially normally to the guide pin axis, and wherein said ball joint means is flattened-off substantially parallel to the pivot plane of said shifting lever means.

12. The combination according to claim 11, wherein said first and second aperture means are provided in said shifting rod means.

13. The combination according to claim 10, wherein said bearing housing means includes an abutment part rigid with said bearing housing means which is arranged essentially perpendicularly to the pivot plane of said shifting lever means and parallel to the axis of the shifting rod means, said abutment part being provided with said first and second aperture means.

14. The combination according to claim 11, wherein said blocking pin means together with the blocking extension is secured substantially coaxially to said shifting lever means on the side of the ball joint means opposite the pivotal connection of said shifting lever means at said bearing housing means, said wider and narrower elongated aperture means being accommodated in said shifting rod means on the side thereof opposite the point of pivotal connection of the shifting lever means at said bearing housing means.

15. The combination according to claim 1, wherein said shifting lever means includes ball joint means, said blocking pin means together with the blocking extension being secured to said shifting lever means on the side of the ball joint means opposite the pivotal support means of said shifting lever means.

16. The combination according to claim 1, wherein said wider and narrower elongated aperture means are accommodated in said shifting rod means on the side thereof opposite the pivotal support means of the shifting lever means.

17. The combination according to claim 15, wherein said wider and narrower elongated aperture means are accommodated in said shifting rod means on the side thereof opposite the pivotal support means of the shifting lever means.

18. The combination according to claim 17, wherein said shifting lever means is provided intermediate the pivotal support means and the ball joint means with a collar, coil spring means arranged concentrically to said shifting lever means and supported, on the one hand, against said collar and on the other, against a part rigid with said shifting rod means.

19. The combination according to claim 18, wherein said last-mentioned part is constituted by the shifting rod means itself.

20. The combination according to claim 1, wherein said shifting lever means includes ball joint means and is provided intermediate the pivotal support means and the ball joint means with a collar, coil spring means arranged concentrically to said shifting lever means and supported, on the one hand, against said collar and on the other, against a part rigid with said shifting rod means.

21. The combination according to claim 20, wherein said last-mentioned part is constituted by the shifting rod means itself.

22. The combination according to claim 11, wherein said shifting lever means is provided intermediate the pivotal connection thereof at the bearing housing means and the ball joint means with a collar, a coil spring arranged concentrically to said shifting lever means which is supported, on the one hand, against said collar and on the other, against a part rigid with said shifting rod means.

23. The combination according to claim 22, wherein said last-mentioned part is constituted by the shifting rod means itself.

References Cited

UNITED STATES PATENTS

| | | | |
|---|---|---|---|
| 2,317,654 | 4/1943 | Wharam | 74—484 |
| 3,229,547 | 1/1966 | Hill | 74—473 |

MILTON KAUFMAN, *Primary Examiner.*